Jan. 19, 1960
R. A. CRESSWELL
2,922,024
ELECTRIC ARC WELDING
Filed May 4, 1955
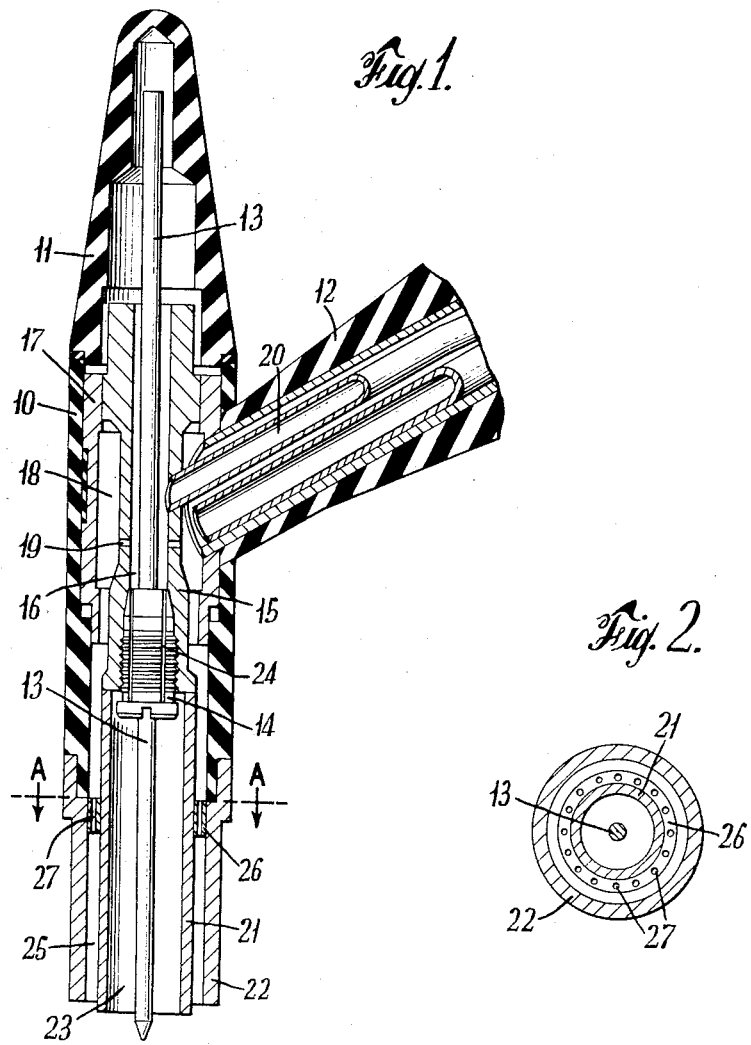
INVENTOR
ROBERT A. CRESSWELL
BY
Richard S. Shreve, Jr.
ATTORNEY

United States Patent Office 2,922,024
Patented Jan. 19, 1960

2,922,024

ELECTRIC ARC WELDING

Robert Arthur Cresswell, London, England, assignor to The British Oxygen Company Limited, a corporation of Great Britain Application May 4, 1955, Serial No. 506,021

Claims priority, application Great Britain May 4, 1954

5 Claims. (Cl. 219—75)

This invention relates to inert gas shielded arc welding using either a non-consumable electrode, for example a tungsten electrode, or a consumable electrode in the form of a metal wire, and relates more particularly to a method of and means for providing more efficient and economical gas shielding.

The apparatus in common use for this type of welding usually incorporates ceramic or water-cooled nozzles of comparatively large dimensions which require comparatively large flows of gas for efficient shielding. These nozzles owing to their size also tend to impede the operator's vision and often make it difficult to weld in corners and confined spaces.

Experiments using Schlieren and shadow photography and smoke as a tracer have shown that an air gap tends to persist between the workpiece and the gaseous shroud, caused by uprising hot air. The presence of this air gap naturally leads to a decrease in the shielding efficiency of the inert gas.

It is an object of the invention to provide a method of and means for inert gas shielded arc welding in which this air gap is minimized to effect more efficient gas shielding, thus giving an increased length of weld per unit volume of gas fed and/or facilitating an improvement in weld quality due to more efficient protection of the weld metal from the effects of atmospheric contamination.

It is a further object of the invention to provide apparatus for effecting inert gas shielded arc welding which can be made of such dimensions as to allow the operator less restricted vision and to enable welding to be carried out more easily in corners and less accessible places.

According to one aspect of the present invention, therefore, a method of inert gas shielded electric arc welding comprises maintaining an arc between the workpiece and an electrode and feeding an inert gas to the welding zone in such manner that the major part of the inert gas fed forms an annular curtain surrounding but spaced from the arc and directed towards a colder part of the workpiece whilst the remainder of the inert gas is fed to the space within the outer curtain of inert gas.

It is found that with this method of feeding the inert gas, the air gap between the workpiece and the gas shield is minimized with consequent improvement in the shielding efficiency.

According to a further feature of the invention, apparatus for inert gas shielded electric arc welding comprises a welding torch having a nozzle assembly comprising an inner tube surrounding and spaced from the electrode and an outer tube co-axial with and spaced from the inner tube and means for supplying an inert gas to the nozzle assembly in such manner that a major proportion of the gas fed traverses the annular space between the two tubes whilst the remainder of the gas fed traverses the space between the inner tube and the electrode.

In the nozzle assembly, the inner tube, which should be of heat-resisting material, performs the functions of confining the gas shield round the arc, and also of protecting the outer parts of the nozzle assembly from heat radiation. The flow of inert gas passing through the annular space between the two tubes, apart from impinging on the workpiece and preventing ingress of air to the gas shield immediately surrounding the arc, also has the effect of cooling the inner tube and keeping it free from oxidation. This cooling effect permits the two tubes to be made of metal and obviates the necessity for water-cooling of the nozzle, so that the nozzle assembly may be made much smaller in size than are conventional nozzles with a consequent improvement in the operator's view of the weld and in the ease of welding in confined spaces.

The ratio between the flow of shielding gas through the annular space between the tubes and through the central orifice will depend upon the welding conditions, but with argon as the shielding gas it is usually within the range of 2 or 3 to 1.

For example, in welding using a non-consumable electrode, an argon flow of 2–2.5 cubic feet per hour down the central orifice and 5–6 cubic feet per hour down the outer annulus has been found to be satisfactory with a nozzle assembly having an inner tube of 5/16 inch internal and 7/16 inch external diameter and an outer tube of ½ inch diameter.

The invention will now be more particularly described with reference to the accompanying drawings, in which:

Fig. 1 is a longitudinal cross-section of an inert gas shielded arc welding torch according to the invention adapted for use with a non-consumable electrode; and Fig. 2 is a cross-section along the line A—A of Fig. 1.

Referring to Fig. 1, the torch comprises an insulated tubular body portion 10 provided with an insulated cap 11 and with an insulated handle, shown in part at 12. A non-consumable electrode 13 is slidably mounted within the body 10 by means of a collet-type holder 14 screwed into an annular metal sleeve 15 surrounding the electrode and defining with it an annular space 16. The sleeve 15 is carried by an outer metal sleeve 17, which fits flush with the inner wall of the body 10. Sleeves 15 and 17 are so shaped as to define between them an outer annular space 18 closed at its end adjacent to the cap 11. Communication between spaces 16 and 18 is provided by ports 19 in the inner sleeve 15.

The handle 12 is provided with an inlet tube 20 adapted to be connected at one end to a source of shielding gas and opening at the other end into the inner annular space 16. The handle is also provided with means for conveying welding current to the holder 14 and thence to the electrode 13.

The electrode 13 at its end remote from the cap is surrounded by two concentric nozzles of relatively thin metal, the inner nozzle 21 being mounted on the end of the inner sleeve 15 and the outer nozzle 22 on the end of the outer sleeve 10. The inner nozzle 21 is spaced from the electrode to form an inner annular passage 23 which communicates with the inner annular chamber 16 through passages 24 in the holder 14. The outer nozzle 22 is spaced from the inner nozzle 21 to define an outer annular passage 25. This passage 25 is interrupted by a ring 26 located between the inner and outer nozzles, communication between the two parts of the outer passage 25 separated by the ring 26 being provided by ports 27 formed in the ring 26.

In operation, when the flow of shielding gas is started, the gas entering through the inlet tube 20 passes into the inner annular space 16. From this space 16, the gas takes two separate paths. A part of the gas passes through the passages 24 in the holder 14 into the inner annular passage 23 to form inner gas curtain immediately surrounding the electrode. The remainder of the gas passes through the ports 19 into the outer annular passage 25 to form the outer gas curtain. By suitable adjustment of the relative sizes of the passages 24 and the ports 19 and 26, the ratio of the gas flows through the two paths may be adjusted to the required value.

What is claimed is:

1. The method of inert gas shielded electric arc welding which comprises maintaining an arc between a workpiece and an electrode and feeding to the welding zone an inert gas which is divided in such manner that the major part of the inert gas fed forms an annular curtain surrounding but spaced from the electrode and the arc and directed towards a colder part of the workpiece whilst the remainder of the inert gas is fed to the space within the outer curtain of inert gas to flow in a separate path and form an inner gas curtain immediately surrounding the electrode and the arc.

2. The method of inert gas shielded electric arc welding which comprises maintaining an arc between a workpiece and an electrode and feeding to the welding zone an inert gas which is divided in such a manner that the major part of the inert gas fed forms an annular curtain surrounding but spaced from the electrode and the arc and directed toward a colder part to the workpiece whilst the remainder of the inert gas is fed to the space within the outer curtain of inert gas to flow in a separate path and form an inner gas curtain immediately surrounding the electrode and the arc, the ratio of the volume of gas forming the outer annular curtain to that forming the inner gas curtain being 2–3 to 1.

3. Apparatus for inert gas shielded electric arc welding comprising a welding torch having a nozzle assembly comprising an inner tube of uniform cross section surrounding and spaced from an electrode and an outer tube of uniform cross section co-axial with and spaced from the inner tube and means for supplying an inert gas to the nozzle assembly in such manner that a major proportion of said gas fed traverses the annular space between said inner and outer tubes, whilst the remainder of said gas fed traverses the space between said inner tube and the electrode.

4. Apparatus for inert gas shielded electric arc welding comprising a welding torch having a nozzle assembly comprising an inner tube surrounding and spaced from an electrode and an outer tube coaxial with and spaced apart from the inner tube, an inlet adapted to be connected at one end to a source of inert gas and opening at the other into a chamber formed within the torch, a first series of ports affording communication between said chamber and the annular space between said inner and outer tubes to feed a major portion of the gas thereto, and a second series of ports affording communication between said chamber and the annular space between said inner tube and the electrode to feed the remainder of said gas thereto.

5. Apparatus for inert gas shielded electric arc welding comprising a welding torch having a nozzle assembly comprising an inner tube surrounding and spaced from an electrode and an outer tube coaxial with and spaced apart from the inner tube, an inlet adapted to be connected at one end to a source of inert gas and opening at the other end into a chamber formed within the torch, a first series of ports affording communication between said chamber and the annular space between said inner and outer tubes to feed a major portion of the gas thereto, and a second series of ports affording communication between said inner tube and the electrode to feed the remainder of said gas thereto, the diameters of the ports of said first and second series being such that the ratio of gas flow through the first series of ports to that through said second series of ports in 2–3 to 1.

References Cited in the file of this patent

UNITED STATES PATENTS

| | | |
|---|---|---|
| 2,510,205 | Baird | June 6, 1950 |
| 2,522,482 | Olzak | Sept. 12, 1950 |
| 2,544,711 | Mikhalapov | Mar. 13, 1951 |
| 2,686,860 | Buck et al. | Aug. 17, 1954 |

FOREIGN PATENTS

| | | |
|---|---|---|
| 128,301 | Austria | May 25, 1932 |
| 149,535 | Austria | May 10, 1937 |